United States Patent [19]
Matsumoto et al.

[11] 3,716,300
[45] Feb. 13, 1973

[54] NULL BALANCE TRIPLE BEAM SPECTROPHOTOMETER

[75] Inventors: Koichi Matsumoto; Makoto Ishikawa, both of Katsuta-shi, Japan

[73] Assignee: Hitachi, Ltd., Tokyo, Japan

[22] Filed: Dec. 16, 1971

[21] Appl. No.: 208,608

[52] U.S. Cl. ..........................356/97, 356/88, 356/89
[51] Int. Cl. ............................G01j 3/08, G01j 3/42
[58] Field of Search................356/51, 88, 89, 93–97; 250/220 R

[56] References Cited

UNITED STATES PATENTS

| | | | |
|---|---|---|---|
| 2,679,184 | 5/1954 | Atwood | 356/97 |
| 2,679,185 | 5/1954 | Atwood | 356/97 |
| 2,984,149 | 5/1961 | Herscher et al. | 356/89 |

FOREIGN PATENTS OR APPLICATIONS 1,089,904  11/1967  Great Britain..........................356/89

*Primary Examiner*—Ronald L. Wibert
*Assistant Examiner*—F. L. Evans
*Attorney*—Craig, Antonelli & Hill

[57] ABSTRACT

The beam modulating portion of a spectrophotometer has three beam paths, a first reference beam path, a second reference beam path, and a common sample beam path. The two reference beams are interrupted alternately by respective choppers which operate in synchronism and the sample beam is inserted into the respective interrupted periods of the two reference beams by a reflection mirror to provide two composite signals. The monochrometer portion of this spectrophotometer is a combination of two monochromators of the conventional type each receiving a respective composite signal.

9 Claims, 5 Drawing Figures

NULL BALANCE TRIPLE BEAM SPECTROPHOTOMETER

BACKGROUND OF THE INVENTION

The present invention relates to a spectrophotometer having three beams and two monochromators therein. A spectroscopic analysis of a certain specimen is performed through spectrophotometers by applying an optical null method or an electrical direct ratio method.

In certain conventional spectrophotometers, two kinds of beams are used, one is used as a reference beam and the other is used as a sample beam, and these beams are interrupted alternately by a chopper and directed to a detector through a monochromator. The output signal of the detector amplified through an A.C. amplifier is transferred to a servomotor for driving recording means, which record continuous spectra of a certain specimen.

In the recent trend in spectroscopic analysis, a spectrophotometer is required to effect a variety of applied optical measurements of materials, such as simultaneous measurement of optical absorption or transmission difference between two predetermined wavelengths, differential values of optical absorption or transmission factor corresponding to wavelength, and simultaneous measurement of standard spectra and a special spectra of high resolving power in a particular range of wavelength. These measurements could be done by combining two spectrophotometers of the type described above, so that each sample beam of the respective spectrophotometers passes through the respective identically prepared specimens. However, it is physically impossible to make the two sample beams pass through the same part of one specimen; accordingly, precise measurements with such a system cannot be obtained. Further, the simultaneous and/or synchronous operation of these two spectrophotometers is quite difficult, in addition to the fact that it requires a long time to get a spectra of a certain material over a wide range of wavelength.

SUMMARY OF THE INVENTION

An object of the present invention is to provide a spectrophotometer which performs a variety of applied optical measurements with good operability.

Another object of the present invention is to provide a spectrophotometer which performs precise applied optical measurements.

Still another object of the present invention is to provide a spectrophotometer which performs various kinds of measurements in a short time.

A spectrophotometer in accordance with the present invention may be called a three beam-two monochromator spectrophotometer. The beam modulating part of the spectrophotometer of the present invention comprises three beam paths, two of them are used for first and second reference beams and the other for a sample beam which passes through a sample to be measured. The first and second reference beams are interrupted alternately by respective choppers which rotate in synchronism and are introduced to first and second detectors, respectively, through each spectroscope. The sample beam is made inserted in the interrupted portions of the first reference beam and the second reference beam by a rotating reflector mirror and is introduced to the first and second detectors respectively through each monochromator, so that the common sample beam can be used for comparison with the first and second reference beams.

DESCRIPTION OF THE PREFERRED EMBODIMENT

Figure 1:
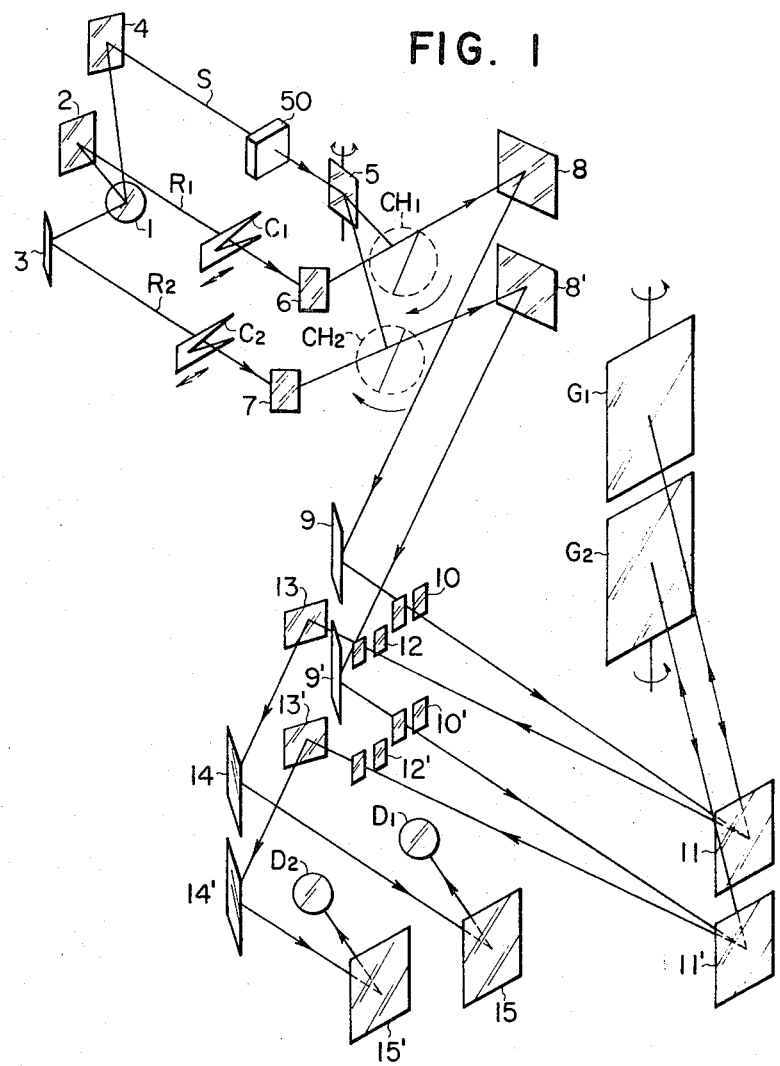
FIG. 1 is a schematic diagram of an optical system in accordance with the present invention.
Figure 2:
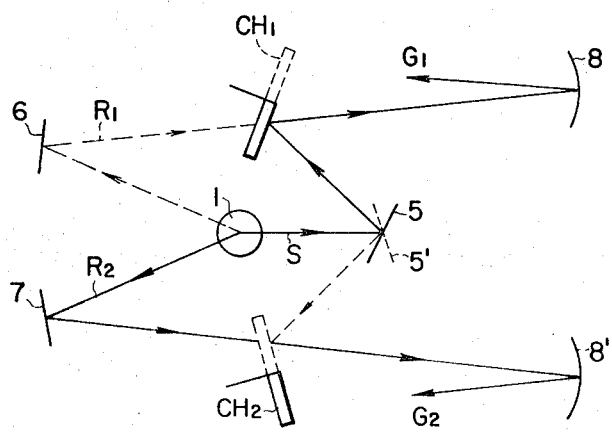
FIG. 2 is a schematic diagram of the beam modulating portion of the present invention.

In FIGS. 1 and 2, a beam from a light source 1 is reflected along three paths by reflection mirrors 2, 3 and 4 to form a first reference beam $R_1$, a second reference beam $R_2$ and a sample beam S. In each beam path of the first and second reference beams, adjustable comb-type attenuators or stops $C_1$ and $C_2$ are arranged, respectively. In the beam path of the sample beam S, specimen 50 is disposed. These two reference beams are interrupted alternately with a predetermined frequency by choppers $CH_1$ and $CH_2$, and the common sample beam S is inserted into each interrupted portion or period of the first and second reference beams by an oscillating reflection mirror 5. The oscillating reflection mirror 5 and the two choppers $CH_1$ and $CH_2$ are operated in synchronous relationship so as to direct the beams toward the respective monochromators in the above-described sequence.

Reference beam $R_1$, which is reflected from a reflection mirror 6 is periodically interrupted with a predetermined frequency by the chopper $CH_1$ and is directed to a reflection mirror 8. During the interrupting period of the reference beam $R_1$, the sample beam S is directed to the reflection mirror 8 by the oscillating reflection mirror 5; consequently, the reference beam $R_1$ directed to the reflection mirror 8 is in the form of a discontinuous pulse-like beam, and between each discontinuous pulse a portion of the sample beam S is inserted. The composite beam directed to the reflection mirror 8 is reflected thereby and also by a reflection mirror 9. The successive beam portions $R_1$ and S pass through an entrance slit 10, and are formed into parallel beams by a collimator 11. The parallel beams are directed to a dispersing means, for instance diffraction grating $G_1$, and are dispersed. After the dispersion, the successive beams passing through an exit slit 12 are reflected by reflection mirrors 13, 14 and 15 and then enter into a detector $D_1$.

Since the oscillating reflection mirror 5 and the choppers $CH_1$ and $CH_2$ are operated with a predetermined relationship, the oscillating mirror 5 changes its position to 5', as shown by a dotted line in FIG. 2. The reference beam $R_2$, which is reflected from a reflection mirror 7, is directed to a reflection mirror 8' through the chopper $CH_2$ during the period that the reference beam $R_1$ is interrupted by the chopper $CH_1$. During the interrupting period of the reference beam $R_2$, the sample beam S is directed to the reflection mirror 8' by the oscillating reflection mirror 5, the position of which at this moment is changed to the solid line position of FIG. 2; consequently, the reference beam $R_2$ directed to the reflection mirror 8' is divided into a discontinuous pulse-like beam, and between each discontinuous pulse, the sample beam S is inserted. The composite beam directed to the reflection mirror 8' is reflected thereby and also by a reflection mirror 9'. The successive beam portions $R_2$ and S pass through an entrance slit 10' and are formed into parallel beams by a collimator 11'. The parallel beams are directed to a diffraction grating $G_2$ and dispersed. After the dispersion, the successive beams passing through an exit slit 12' are reflected by reflection mirrors 13', 14' and 15' and then enter into a detector $D_2$.

Figure 3:
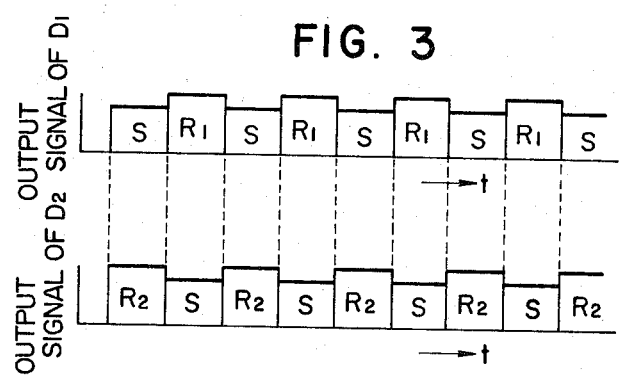
FIG. 3 is a diagram of the output signals which appear at the first and second detectors of the present invention.

The output signals of the detectors $D_1$ and $D_2$ are shown in FIG. 3. As an output signal of the detector $D_1$, pulse-like successive signals S and $R_1$ appears which correspond to the intensity of the sample beam S and the reference beam $R_1$. The duration of each of the pulse-like signals S and $R_1$ is determined by the frequency of the chopper $CH_1$ and oscillating frequency of the oscillating reflection mirror 5. Simultaneously, as an output signal of the detector $D_2$, pulse-like successive signals S and $R_2$ appears which correspond to the intensity of the sample beam S and reference beam $R_2$. As will be seen from FIG. 3, at the moment when the sample beam enters into one detector the other reference beam enters into the other detector and vice versa.

Figure 4:
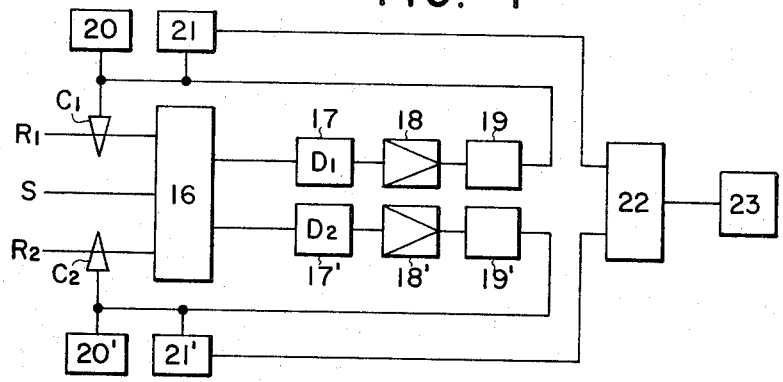
FIG. 4 is a schematic block diagram of an optical null system in which the present invention is applied.

In FIG. 4 two reference beams $R_1$ and $R_2$ and one common sample beam are applied to an optical exchanging system 16 which is equivalent to the beam modulating subsystem shown in FIG. 2. Through the optical exchanging system 16, the reference beam $R_1$ and sample beam S are introduced alternately to a detector 17 which corresponds to the detector $D_1$ in FIG. 1. The reference beam $R_2$ and sample beam S are introduced alternately to a detector 17' which corresponds to the detector $D_2$. The signals detected by the detectors 17 and 17' are transferred to balancing motors 19 and 19', respectively, through respective amplifiers 18 and 18', and drive the motors 19 and 19'. The shafts of each of the balancing motors is operatively connected to the adjustable stops, $C_1$ and $C_2$ so as to adjust the intensity of the reference beams $R_1$ and $R_2$. Pen mechanisms 20 and 20' of a recorder are operatively connected to the adjustable comb-type attenuators $C_1$ and $C_2$, respectively. The function of the spectrophotometer of this arrangement is equivalent to that of two conventional plural beam-type spectrophotometers combined in parallel and having an adjustable attenuator. Signal generators 21 and 21' generate respective electrical output signals proportional to the displacement of the adjustable combtype attenuators $C_1$ and $C_2$ which are transmitted to a recorder 23 through a differential amplifier 22.

In the arrangement described above, the position of the diffraction grating $G_1$ is defined so as to diffract a predetermined wavelength $\lambda_1$ and also the position of $G_2$ is defined so as to diffract the other predetermined wavelength $\lambda_2$, and the displacements of the adjustable comb-type attenuators $C_1$ and $C_2$ are proportional to the optical absorption or transmission factor of the specimen at the wavelengths $\lambda_1$ and $\lambda_2$, respectively. As a result, a difference value of the optical absorption factor A or transmission factor T of the specimen between the two wavelengths $\lambda_1$ and $\lambda_2$ is recorded on the recorder 23. This means that the spectrophotometer of the present invention can be used as a two-wave spectrophotometer.

Another situation occurs when two diffraction gratings having identical grating constants are used for the diffraction gratings $G_1$ and $G_2$ in FIG. 1 and the positions of the two diffraction gratings $G_1$ and $G_2$ at the initial stage are defined so that one diffracts wavelength $\lambda_1$ and the other wavelength $\lambda_2$, and the difference $\Delta\lambda$ between $\lambda_1$ and $\lambda_2$ is selected smaller. After setting the condition and the positions as explained above, when both diffraction gratings $G_1$ and $G_2$ are rotated with the same velocity keeping the wavelength difference $\Delta\lambda$, a differential value of the optical absorption factor $dA/d\lambda$ or transmission factor $dT/d\lambda$ corresponding to the wavelength is recorded on the recorder 23 with the wavelength as the abscissa.

Further, when two identical other recorders (not shown) are connected respectively to the signal generators 21 and 21', or a two-pen recorder (not shown) is connected to the respective output terminals of the signal generators 21 and 21', and a standard slit program is applied to the slits 10 and 12 and a special slit program to the slits 10' and 12', two different kinds of spectra are obtained from the same specimen, one a standard spectra and the other a particular spectra having a high resolving power for a particular wavelength range.

Further, when the diffraction gratings $G_1$ and $G_2$ have a different grating constant and a two-pen recorder (not shown) is connected to respective output terminals of the signal generators 21 and 21' so that one pen of the two-pen recorder records one spectra of the specimen covering one predetermined wavelength range corresponding to the diffraction grating $G_1$ and simultaneously the other records the other spectra of the specimen covering another predetermined wavelength range corresponding to the diffraction grating $G_2$, the recording or measuring time for obtaining the spectra of the specimen covering a wide range of wavelengths is reduced by one-half as compared to the conventional method in which after the measurement with one diffraction grating covering one predetermined wavelength range, the diffraction grating is exchanged for another one covering another predetermined wavelength range and another measurement then begins.

Figure 5:
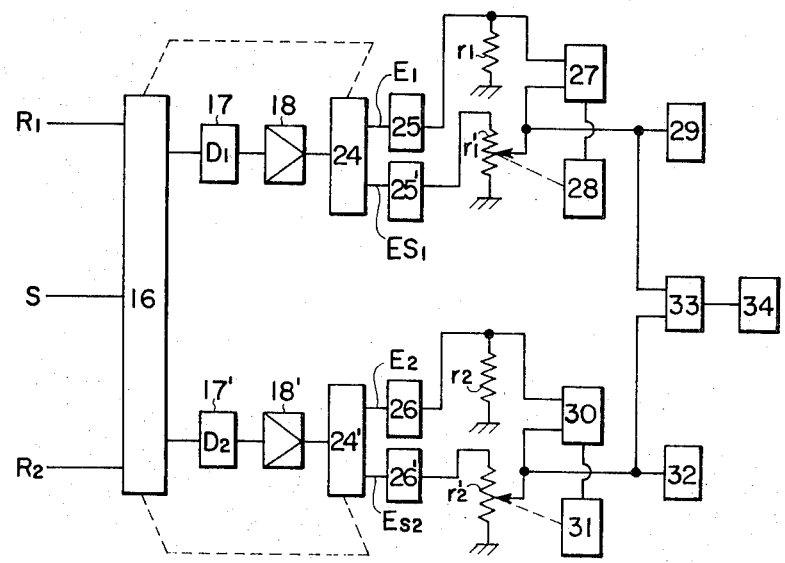
FIG. 5 is a schematic block diagram of an electric direct ratio system in which the present invention is applied.

In FIG. 5 the detected signals of the detector 17 and 17' are amplified through the amplifiers 18 and 18' and discriminated through exchanging switches 24 and 24' which operate in synchronism with the optical exchanging systems 16 and 16'. Signal $E_1$ corresponding to the reference beam $R_1$ is shaped through a filter 25 and transmitted to a resistor $r_1$ as a standard signal. Signal $E_{s1}$ corresponding to the sample beam S is shaped through a filter 25' and transmitted to a potentiometer $r_1'$ as a comparing signal. These standard and comparing signals are transferred to a differential amplifier 27, and if a difference between the two signals exists, the output signal of the differential amplifier 27 is transmitted to a balancing motor 28 which is rotated so as to move the movable contact of the potentiometer $r_1'$ to the position where the difference between the two signals disappears. A recorder 29 is provided so as to record the movement of the movable contact of the potentiometer $r_1'$.

The other half of the system illustrated in FIG. 5, that is the lower part thereof, is identical to that of explained above. Through exchanging switch 24' a standard signal $E_2$ and a comparing signal $E_{s1}$ each of which corresponds respectively to the reference beam $R_2$ and the sample beam S are shaped through respective filters 26 and 26' and transmitted to a resistor $r_2$ and a potentiometer $r_2'$, respectively. These two signals are transferred to a differential amplifier 30 and the output signal of the differential amplifier 30 is transmitted to a balancing motor 31 which is rotated so as to move the movable contact of the potentiometer $r_2'$ to the position where the difference between the two signals disappears. A recorder 32 is provided so as to record the movement of the movable contact of the potentiometer $r_2'$.

Both input signals to the recorders 29 and 32 are also transferred to a differential amplifier 33, the output of which is further introduced to a recorder (not shown). Also a two-pen recorder (not shown) may be connected to the input terminals of the recorders 29 and 32, when it is required to get the various applied optical measurements explained in connection with the system of FIG. 4.

As explained above, the optical elements, such as the oscillating mirror, choppers and reflection mirrors which constitute the beam modulating part of the present invention are confined together. Thus, it will be apparent that the operability of the spectrophotometer of the present invention is increased. In the preferred embodiment shown in FIG. 1. A common electric lamp is used as the light source, however, three different light sources can be used. Further, oscillating mirror 5 is used to direct the sample beam in two different directions, however, two static reflection mirrors can substitute for the oscillating mirror. In this case, however, the intensity of the sample beam reduces to one-half that of the embodiment of FIG. 1.

What is claimed is:

1. A spectrophotometer comprising
   light source means;
   beam modulating means including means for directing the light from said light source means along a first reference beam path, a second reference beam path, and a sample beam path, chopper means for alternately interrupting the beams in said first and second reference beam paths and reflection mirror means disposed in said sample beam path for reflecting the beam in said sample beam path so as to insert successive portions of the beam therein into each interrupted period of the reference beams in said first and second reference beam paths to thereby form first and second composite pulse-like beams, respectively;
   a first monochromator into which said first composite pulse-like beam is directed from said beam modulating means;
   a second monochromator into which said second composite pulse-like beam is directed from said beam modulating means;
   a first detector for detecting the output beam signal from said first monochromator; and
   a second detector for detecting the output beam signal from said second monochromator.

2. A spectrophotometer as defined in claim 1 wherein said chopper means includes a first chopper periodically interrupting the beam in said first reference beam path, a second chopper periodically interrupting the beam in said second reference beam path, said first chopper operating to interrupt the first reference beam when the second reference beam is uninterrupted and said second chopper operating to interrupt the second reference beam when the first reference beam is uninterrupted.

3. A spectrophotometer as defined in claim 2, further including a first attenuator disposed in said first reference beam path and a second attenuator disposed in said second reference beam path.

4. A spectrophotometer as defined in claim 3 wherein said reflection mirror means comprises an oscillating reflection mirror disposed in said sample beam path and moving in synchronism with said first and second choppers.

5. A spectrophotometer as defined in claim 3, further including adjusting means responsive to the outputs of said first and second detectors for adjusting the positions of said first and second attenuators, respectively, to adjust the intensity of the reference beams in said first and second reference beam paths and recording means for recording the relative positions of said first and second attenuators.

6. A spectrophotometer as defined in claim 5 wherein said adjusting means includes first and second balance motors responsive to the outputs of said first and second detectors, respectively, and connected to said first and second attenuators for adjusting the position thereof.

7. A spectrophotometer as defined in claim 1 wherein the outputs of said first and second detectors are connected to respective synchronous switches operating in connection with said first and second monochromators to produce a sample signal and a standard signal at the output of each switch, first and second differential amplifiers receiving the sample and standard signals provided by the respective switches, means for balancing the sample and standard signals at the output of each switch in response to the output of a respective differential amplifier and recording means for recording the value of the adjustment provided by said balancing means.

8. A spectrophotometer as defined in claim 1, further including a first attenuator disposed in said first reference beam path and a second attenuator disposed in said second reference beam path.

9. A spectrophotometer as defined in claim 1 wherein said reflection mirror means comprises an oscillating reflection mirror disposed in said sample beam path and moving in synchronism with said first and second choppers.

* * * * *